United States Patent [19]

Scherzer et al.

[11] Patent Number: 4,897,431
[45] Date of Patent: * Jan. 30, 1990

[54] PROCESS FOR THE PREPARATION OF PRIMARILY CLOSED CELL RIGID FOAMS CONTAINING URETHANE GROUPS OR URETHANE- AND ISOCYANURATE GROUPS, AND THEIR USE

[75] Inventors: Dietrich Scherzer, Nottingham, Great Britain; Joachim Streu, Diepholz, Fed. Rep. of Germany

[73] Assignee: BASF Aktiengesellschaft, Ludwigshafen, Fed. Rep. of Germany

[*] Notice: The portion of the term of this patent subsequent to Mar. 15, 2005 has been disclaimed.

[21] Appl. No.: 127,269

[22] Filed: Dec. 1, 1987

[30] Foreign Application Priority Data

Dec. 13, 1986 [DE] Fed. Rep. of Germany ....... 3642666

[51] Int. Cl.⁴ ..................... C08G 18/00; C08G 18/14
[52] U.S. Cl. ..................................... 521/172; 521/173
[58] Field of Search ................................. 521/172, 173

[56] References Cited

U.S. PATENT DOCUMENTS

| 3,288,732 | 11/1966 | Chapman et al. | 521/173 |
|---|---|---|---|
| 3,661,811 | 9/1970 | Hardy et al. | 521/173 |
| 4,576,974 | 3/1986 | Carroll et al. | 521/173 |
| 4,595,705 | 6/1986 | Werner et al. | 521/172 |
| 4,731,392 | 3/1988 | Streu et al. | 521/172 |

FOREIGN PATENT DOCUMENTS

| 2451383 | 10/1980 | France . |
|---|---|---|
| 781469 | 8/1957 | United Kingdom . |
| 1429735 | 3/1976 | United Kingdom . |

Primary Examiner—John Kight
Assistant Examiner—Dennis R. Daley
Attorney, Agent, or Firm—William G. Conger; John C. Demeter

[57] ABSTRACT

Disclosed is a process for the preparation of primarily closed cell rigid foams, useful for strengthening mechanical construction parts or for use as insulation material, containing urethane groups, or urethane and isocyanurate groups where the polyol component is a higher molecular weight polyester polyol, containing in bonded form units having one or more of the structures:

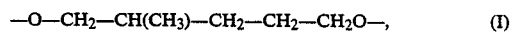

—O—CH₂—CH(CH₃)—CH₂—CH₂—CH₂O—, (I)

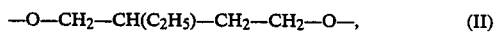

—O—CH₂—CH(C₂H₅)—CH₂—CH₂—O—, (II)

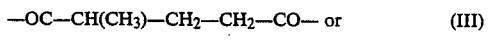

—OC—CH(CH₃)—CH₂—CH₂—CO— or (III)

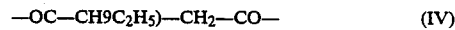

—OC—CH9C₂H₅)—CH₂—CO— (IV)

or a mixture of said polyester polyol and known polyester polyols and/or polyether polyols.

9 Claims, No Drawings

PROCESS FOR THE PREPARATION OF PRIMARILY CLOSED CELL RIGID FOAMS CONTAINING URETHANE GROUPS OR URETHANE- AND ISOCYANURATE GROUPS, AND THEIR USE

BACKGROUND OF THE INVENTION

1. Field of the Invention

The present invention generally relates to primarily closed cell rigid foams useful for strengthening mechanical construction parts or for use as insulation material containing urethane groups, or urethane and isocyanurate groups, and more particularly to the polyol component used in preparing these foams.

2. Description of the Relevant Art

The preparation of cellular and non-cellular foams containing urethane groups and/or isocyanurate groups is well known.

An overview regarding the preparation and properties of polyurethane- (PU)- rigid foams is found, for example, in the *Plastics Handbook* Volume 7, Polyurethanes, edited by R. Vieweg and A. Hoechtlen, pgs 504 ff. (Verlag Carl Hanser, Munich, 1966). Polyisocyanurate (PIR) foams and/or modified PIR foams are described for example in *Advances in Urethane Science and Technology*, Volume 3, pgs. 141 ff and Volume 2, pgs. 241 ff. (Technomic Publishing Co., Inc., 1973 and 1974).

In preparing PU foams and/or PIR rigid foams routinely, aromatic polyisocyanates are reacted with higher molecular weight polyols, preferably polyether polyols or polyester polyols, in the presence of blowing agents, catalysts, flame retardants and other auxiliaries and additives. Also known is using mixtures of these starting components in place of the polyether polyols or polyester polyols. One important factor, in using mixtures of the starting components, was a cost reduction, which is achieved by mixing expensive, suitable, polyester polyols with economical polyether polyols in the preparation of high quality PU rigid foams. Suitable polyester polyols having a low viscosity, used in the preparation of PU rigid foams having good mechanical properties, are for example disclosed in DE-A 27 04 196. For preparing the polyester polyols, dicarboxylic acid mixtures comprising succinic, glutaric and adipic acids in certain quantity ratios are polycondensed with an isopropanol amine mixture and/or a hexanetriol isomeric mixture as well as with other lower molecular weight multivalent alcohols.

When using polyester polyols as a higher molecular weight polyhydroxyl compounds in the preparation of rigid foams containing urethane and isocyanurate groups, their flame resistance is improved and the brittleness is reduced. However, a disadvantage is that the polyester polyols are insufficiently miscible with the low boiling point halogenated hydrocarbons used as blowing agents due to their relatively high polarity in comparison to polyether polyols, preferably polyoxypropylene polyols. Especially when the polyurethane rigid foam formulations, affording flame resistant, containing isocyanurate groups, at a high isocyanate index, whose polyol component is predominantly difunctional polyester polyols, can one no longer dissolve sufficient quantities of halogenated hydrocarbon, blowing agent in the polyester polyol.

In order to overcome this disadvantage, the organic polyisocyanates are diluted for example with the low boiling point halogenated hydrocarbons. Also employed are chemically effective blowing agents, such as water or carboxyl group containing compounds, which react with isocyanates to form carbon dioxide.

Following the disclosure in DE A 29 35 402 (EPA 24 524), alkoxylated alkylphenols are used as solubility mediators for improving the compatibility of polyester polyols and halogenated hydrocarbons.

The objective of the present discovery was to prepare the most cost effective rigid foams containing urethane groups or urethane and isocyanurate groups having good mechanical properties, a high hydrolysis stability and particularly low densities, e.g. from 25 to 35 g/l in the absence of expensive solubility mediators which routinely worsen the mechanical properties This objective was surprisingly met by the complete or partial use of polyester polyols with alkyl pendant groups as higher molecular weight polyol in the preparation of polyisocyanurate foams containing polyurethane groups and preferably urethane groups.

SUMMARY OF THE INVENTION

The subject of the present invention is a process for the preparation of primarily closed cell rigid foams containing urethane groups or urethane and isocyanurate groups by the reaction of (a) an organic polyisocyanate with (b) a higher molecular weight polyol in the presence of (c) a catalyst and (d) a blowing agent, and optionally further including (e) chain extending agents and or cross linkers, (f) auxiliaries and/or additives;

wherein said polyol (b) is a polyester polyol containing in bonded form units having one or more of the structures selected from the group:

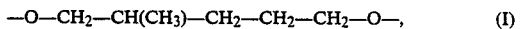
$$-O-CH_2-CH(CH_3)-CH_2-CH_2-CH_2-O-, \quad (I)$$

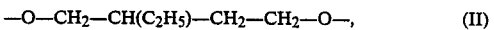
$$-O-CH_2-CH(C_2H_5)-CH_2-CH_2-O-, \quad (II)$$

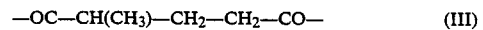
$$-OC-CH(CH_3)-CH_2-CH_2-CO- \quad (III)$$

and

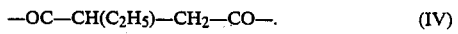
$$-OC-CH(C_2H_5)-CH_2-CO-. \quad (IV)$$

The present invention includes using the primarily closed cell rigid foams containing urethane groups or preferably urethane and isocyanurate groups, which are prepared according to the process described herein for strengthening mechanical construction parts or as insulating material.

DESCRIPTION OF THE PREFERRED EMBODIMENTS

The linear polyester polyols, for example ethylene glycol-1,4-butanediol-polyadipate are active between the molecular chains over the entire length because of both strong dipol-dipol-reciprocal effects and dispersion forces. Due to this strong intermolecular reciprocal action and the high degree of order associated with this, it is not possible for the halogenated hydrocarbons to penetrate between the molecular chains and to solvate them. Such polyester polyols and the halogenated hydrocarbons used as blowing agents therefore exhibit only a limited miscibility. Surprisingly, using polyester polyols having alkyl pendant groups decreases this intermolecular reciprocal action. The halogenated hydrocarbons are probably able to partially cleave the loose bonds between the polyester polyols, so that they are substantially more miscible with the polyester polyols. Also advantageous is that the polyester polyols used according to the process of this invention exhibit a low viscosity and therefore are liquid at room temperature and are easily processable.

The polyester polyols used according to the process of this invention, which preferably contain in bonded form units having one or more of the structures selected from

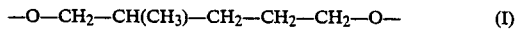     (I)

and/or

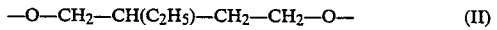     (II)

and/or

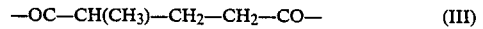     (III)

and/or

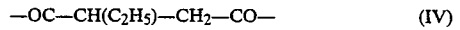     (IV)

have an average functionality from 2 to 3, preferably from 2 to 2.5; a hydroxyl number of from 100 to 400, preferably from 120 to 400; an acid number smaller than 10 mg KOH/g, preferably smaller than 2 mg KOH/g, and more preferably from 1.5 to 0.1 mg KOH/g; and a viscosity at 25° C. of from 200 to 10,000, preferably from 500 to 10,000 mPas. The products contain up to at least 20 weight percent, preferably up to at least 25 weight percent, and more preferably up to at least 30 weight percent, based on the total weight, of units having one or more of structures I through IV, and are characterized by high compatibility with halogenated hydrocarbons.

Polyisocyanurate rigid foams containing polyurethane groups or preferably urethane groups prepared from these polyester polyols have a high mechanical property level, particularly good hydrolysis stability and are suited for numerous technical applications; most preferably for strengthening mechanical construction parts or as insulation material.

The polyester polyols used according to the process of this invention are effaciously prepared by polycondensation in the presence or absence of diluents or preferably in the melt, as well as in the presence or absence of catalysts, from organic polycarboxylic acids and/or polycarboxylic acid derivatives, such as polycarboxylic acid alkylesters and/or anhydrides from the group: 3-methyl glutaric acid; 2-ethyl succinic acid; organic dicarboxylic acids, such as aliphatic dicarboxylic acids having from 2 to 12 carbon atoms, preferably from 4 to 6 carbon atoms; cycloaliphatic dicarboxylic acids having from 8 to 24 carbon atoms, preferably from 12 to 18 carbon atoms; aromatic dicarboxylic acids having from 8 to 24 carbon atoms, preferably 8 carbon atoms; or mixtures of at least 2 dicarboxylic acids and/or dicarboxylic acid derivatives; and multivalent aliphatic alcohols from the group; 2-methyl-1,5-pentanediol, 2-ethyl-1,4-butanediol, linear or branched, optionally containing ether bridges; di through tetra valent alcohol; or mixtures of at least 2 of the multivalent aliphatic alcohols provided that the starting materials used contain at least one compound from the group: 2-methyl-1,5-pentanediol; 2-ethyl-1,4-butanediol; 2-methylglutaric acid; and/or 2-ethylsuccinic acid or their corresponding dicarboxylic acid derivatives.

Suitable aliphatic dicarboxylic acids are: dodecanoic, undecanoic, sebacic, azelic, subaric, pimelic, adipic, glutaric, succinic, malic and oxalic acids; examples of cycloaliphatic dicarboxylic acids: hexahydroisophthalic acid, hexahydroterphthalic acid and hexahydrophthalic acid; and examples of aromatic dicarboxylic acids are: isophthalic acid, terphthalic acid and phthalic acid. In place of the organic dicarboxylic acids, the corresponding dicarboxylic acid derivatives can be used, for example, dicarboxylic monoalkyl ester and/or dicarboxylic acid dialkyl ester having from 1 to 4 carbon atoms, preferably from 1 to 2 carbon atoms in the alkyl radical, such as dicarboxylic-mono- and/or di-methyl-, ethyl-, n-propyl-, isopropyl- and butylester, and/or -anhydrides. Preferably used are phthalic acids, phthalic acid monomethyl ester and/or phthalic acid di-methyl ester, phthalic acid anhydride, mixtures comprising succinic, glutaric and adipic acid, preferably in weight ratios of 20 to 35:35 to 50:20 to 32 parts by weight and especially adipic acid.

Along with 2-methyl-1,5-pentanediol, 2-ethyl-1,4-butane diol or mixtures of 2-methyl-1,5-pentane diol and 2-ethyl-1,4-butanediol, in weight ratios of from 1:99 to 99:1, preferably form 20:80 to 80:20, aliphatic divalent through tetravalent alcohols, preferably trivalent and more preferably divalent alcohols. Branched and/or preferably linear alkane diols having from 2 to 12 carbon atoms, more preferably from 2 to 6 carbon atoms in the alkylene radicals; polyoxyalkylene diols, preferably those based on 1,2-propylene oxide and/or ethylene oxide, having a molecular weight from 106 to 622, preferably from 106 to 262; linear or branched alkane triols having form 3 to 6 carbon atoms and/or pentaerythritol. Examples of alkane diols include: 2,2-dimethyl-1,3-propane diol, 2,2,4-trimethyl-1,6-hexandediol, 1,3-butanediol, ethanediol, 1,2- and or 1,3-propanediol, 1,4-butanediol, 1,5-pentanediol, 1,6-hexanediol, 1,8-octanediol, 1,10-decanediol and 1,12-dodecanediol; polyoxyalkylene diols, such as diethylene glycol, trioxyethylene glycol, tetraoxyethylene glycol and higher molecular polyoxyethylene glycols, dipropylene glycols, trioxypropylene glycol, tetraoxypropylene glycol and higher molecular polyoxyethylene glycols, dipropylene glycol, trioxypropylene glycol, tetoxypropylene glycol and higher molecular polyoxypropylene glycols, as well as polyoxypropylene polyoxyethylene glycols; and alkane triols such as trimethylolethane, trimethylolpropane, and glycerin. The multivalent aliphatic alcohols, optionally containing ether groups, are employed individually or in the form of mixtures. Preferably used are: ethanediol, 1,2 and or 1,3-propanediol, 1,4-butanediol, 1,5-pentanediol, 1,6-hexanediol, diethylene glycol, dipropylene glycol, glycerin, trimethylolpropane or a mixture of at least two of the multivalent aliphatic alcohols.

As long as 2-methyl glutaric acid and/or 2-ethyl succinic acid is not used exclusively as the polycarboxylic acid and or polycarboxylic acid derivative in preparing the polyester polyols, and as long as 2-methyl-1,5-pentane diol and or 2-ethyl-1,4-butanediol are not exclusively used as multivalent alcohols, then mixtures of polycarboxylic acids and/or polycarboxylic acid derivatives and mixtures of multivalent alcohols can be used, which preferably comprises from about 0 to about 100 weight percent, more preferably from 20 to 80 weight percent, of 2-methyl glutaric acid and/or 2-ethyl succinic acid and from about 100 to about 0 weight percent, more preferably from 80 to 20 weight percent, of an aliphatic, cycloaliphatic, and/or aromatic dicarboxylic acid and/or the corresponding dicarboxylic acid derivatives and/or from about 0 to about 100 weight percent, more preferably from 20 to 80 weight percent of 2-methyl-1,5-pentanediol and/or 2-ethyl-1,4-butanediol and about from 100 to about 0 weight percent, more preferably from 80 to 20 weight percent of at least 1 linear or branched, optionally containing ether bridges, aliphatic di through tetravalent alcohol; wherein the weight percents are based on the total weight of the respective mixture. Yet, even here there is a provision that the polyester polyols prepared contained in bonded form at least 20 weight percent, based on the entire weight, of units having structures I and/or II and/or III and/or IV.

As already stated, the organic polycarboxylic acids and/or polycarboxylic acid derivatives and multivalent alcohols be polycondensed, catalyst free or in the presence of both esterification or transesterification catalysts. Examples of esterification catalysts are: iron, cadmium, cobalt, lead, zinc, antimony, magnesium, titanium, and tin catalysts; in the form of metals, metal oxides or metal salts. Preferably used are tin salts, such as according to U.S. Pat. No. 3,162,616, tin dioctoate and/or tetrabutylorthotitanate. Examples of transesterification catalysts are tindioctoate and/or tetrabutylorthotitanate.

In preparing the polyester polyols, the organic polycarboxylic acid dialkylesters, preferably 2-methyl glutaric acid dimethylester and/or 2-ethyl succinic acid dimethylester, optionally mixed with aliphatic, cycloaliphatic and/or aromatic dicarboxylic acid alkylesters and aliphatic multivalent alcohols or mixtures of 2-methyl-1,5-pentanediol and/or 2-ethyl-1,4-butanediol and aliphatic multivalent alcohols or aliphatic, cycloaliphatic and/or aromatic dicarboxylic acid alkylester and 2-methyl-1,5-pentanediol and/or 2-ethyl-1,4-butanediol in a mole ratio from 1:1 to 1:2, preferably from 1:1 to 1:1.5, are transesterified without a diluent, or in the presence of diluents, as well as catalyst free or preferably while using transesterification catalysts. After completing the transesterification, both the optionally present excess alcohol and diluent are preferably distilled off under reduced pressure The polyester polyols are preferably prepared by polycondensation under azeotropic conditions or more preferably in the melt, catalyst free or preferably while using esterification catalysts, in an atmosphere of an inert gas, such as nitrogen, carbon monoxide, helium, argon, etc, at temperatures of from 80° to 250° C., preferably from 150° to 220° C., and more preferably from 180° to 220° C.; optionally under reduced pressure up to the desired acid number which is preferably smaller than 2. Examples of diluents and/or water entraining agents are: benzene, toluene, xylene, chlorobenzene, dichlorobenzene and others. The organic polycarboxylic acids and/or derivatives and aliphatic multivalent alcohols are used in such quantities so that the ratio of carboxyl groups and/or equivalent reactive carboxylic acid derivative radicals to the hydroxyl groups is from 1:1 to 1.8, preferably from 1:1.05 to 1.2. Following a preferred embodiment, the esterification mixture is polycondensed within the above stated temperature range up to an acid number from 80 to 30, more preferably from 40 to 30, under normal pressure and subsequently under a pressure smaller than 500 mbar, more preferably from 50 to 150 mbar. Here, normal polycondensation times required are from 10 to 30 hours, preferably from 15 to 20 hours.

The following are suitable with respect to the other starting components used in the preparation of the primarily closed cell rigid foams containing urethane groups or urethane and isocyanurate groups.

(a) Aromatic multivalent isocyanates are preferably organic polyisocyanates, wherein more preferably used are aromatic, optionally modified polyisocyanates having a low vapor pressure. Examples of polyisocyanates are 4,4', 2,4' and 2,2' diphenylmethane diisocyanate and the corresponding isomeric mixtures, polyphenyl, polymethylene polyisocyanates and mixtures of diphenylmethane diisocyanates and polyphenyl polymethylene polyisocyanates (polymeric MDI).

Also suitable are the so called modified multivalent isocyanates, such as polyisocyanates which are obtained by the chemical reaction of aromatic di and/or polyisocyanates. Examples are aromatic di- and/or polyisocyanates containing ester, urea, biuret, allophanate and preferably urethane, uretoneimene, isocyanurate and/or carbodiimide groups; such as based on 2,4 and 2,6 tolulene diisocyanates and more preferably those based on 4,4', 2,4', 2,2' diphenylmethane diisocyanates and polymeric MDI. The organic polyisocyanates can used individually or in the form of mixtures.

The following are preferably used: mixtures of diphenylmethane diisocyanates and polyphenylpolymethylene polyisocyanates having a diphenylmethane diisocyanate isomeric content from 20 to 65 weight percent, preferably from 20 to 45 weight percent, based on the total weight; and modified, preferably diphenylmethane diisocyanates containing carbodiimide, isocyanurate, urethane and/or uretoneimine groups, diphenylmethane diisocyanate isomeric mixtures and polymeric MDI having an NCO content from 33.6 to 15 weight percent, preferably from 31 to 21 weight percent, based on the total weight.

(b) Preferably used as higher molecular polyols are the above described, polyester polyols containing in bonded form units having one or more of structures I through IV. However, also suitable are polyol mixtures which comprise:
(i) 30 to about 100 weight percent, preferably from 50 to about 100 weight percent of a polyester polyol which contains in bonded form one or more of structures I through IV, and
(ii) from 70 to about 0 weight percent, preferably from 50 about 0 weight percent of a knownary polyester polyol and/or a polyether polyol, wherein the weight percents are based on the total weight of the polyol mixture.

The following are used as organic dicarboxylic acids in preparing the ordinary (known) polyester polyols within the scope of this invention: the previously mentioned aromatic dicarboxylic acids, preferably phthalic acid and/or terphthalic acid and aliphatic dicarboxylic acids having from 2 to 12, preferably from 4 to 8 carbon atoms and the previously mentioned multivalent alcohols, preferably di and/or trivalent alcohols, wherein the polyester polyols preferably contain in bonded form none, or only in secondary quantities, units having structures I to III and/or IV. In place of the polycarboxylic acids in preparing the ordinary polyester polyols, also useable are the corresponding polycarboxylic acid derivatives or mixtures of polycarboxylic acids and/or derivatives.

Typical polyether polyols are those prepared by the anionic polymerization of alkylene oxides or alkylene oxide mixtures having from 2 to 4 carbon atoms in the alkylene radical and one more more initiator molecules having at least 2 reactive hydrogen atoms, in the presence of alkali hydroxides such as sodium or potassium hydroxide or alkali alkoholates as catalysts.

Examples of alkylene oxides are: 1,2 and/or 2,3-butylene oxide, epichlorohydrine and preferably 1,2 propylene oxide and ethylene oxide. The alkylene oxides are used individually, alternating one after another or as mixtures. Examples of initiator molecules used in preparing the di- through octa-functional, preferably tri through hexa functional polyether polyols are: water, dicarboxylic acids such as succinic, glutaric, adipic, phthalic and terphthalic acid, optionally N-mono- and N,N- and/or N,N'-dialkyl substituted diamines having from 1 to 4 carbon atoms in the alkyl radical, such as N-mono- and N,N- and/or N,N'-dialkyl substituted ethylene diamine, 1,3 propylene diamine, 1,3 and/or 1,4 butylene diamines, 1,5 pentamethylene diamine and 1,6 hexamethylene diamine, phenylene diamines, 2,4 and 2,4 toluene diamine and 4,4'2,4' and 2,2' diamino diphenyl methane, alkanol amines such as ethanolamine, diethanol amine, N-methyl and N-ethyl ethanol amine, N-methyl and N-ethyl di-ethanolamine and triethanol amine as well as ammonia. Preferably used are di through octavalent, more preferably trivalent through hexavalent alcohols or mixtures thereof such as ethanediol, 1,3 and/or propanediol, 1,4 butanediol, 1,5 pentanediol, 1,6 hexanediol, diethylene glycol, dipropylene glycol, glycerin, trimethylolpropane, pentaerythritol and sugar alcohols, preferably sorbit and sucrose.

The ordinary polyester polyols and/or polyether polyols may be employed individually or as mixtures.

(c) Ordinary cyclization catalysts and polymerization catalysts for polyisocyanates are used in preparing the PU-PIR rigid foams. Examples are: strong bases such as quaternary ammonium hydroxides, such as benzyltrimethyl ammonium hydroxide; alkalimetal hydroxides, such as sodium or potassium hydroxide; alkali metal alkoxides, such as sodium methalate and potassium issoproplate; trialkyl phosphines, such as triethyle phosphine; alkylamino alkylephenols, such as 2,4,6-tris-(dimethylaminomethyl)-phenol; pyridines substituted in the third and/or fourth position, such as 3- or 4-methylpyridine; metal organic salts, such as Tetrakis-(hydroxyethyl)sodium borate; Friedel-Crafts-Catalysts, e.g. aluminum chloride, iron-(III)-chloride, borin floride and zinc chloride; and alkaline metal salts of weak organic acids and nitrophenolates, such as potassium octoate, potassium 2-ethylhexoate, potassium benzoate, sodium picrate and potassium phthalimide. Preferably used are the strongly basic N,N',N''-Tris-(dialkylaminoalkyl)-s-hexahydrotriazines, N,N',N''-Tris-dimethylaminopropyl)-s-hexahydrotriazine, optionally in combination with aliphatic lower molecular weight mono- and/or dicarboxylic acids, such as acetic acid and/or adipic acid or aromatic carboxylic acids like benzoic acid. The amount of polyisocyanurate catalyst which is used, individually or in the form of mixtures, depends on the effectiveness of the catalyst in question and typically is from 0.1 to 5 weight percent, based on the entire weight of the higher molecular weight polyol (b).

In order to accelerate the reaction between the starting components containing hydroxyl groups and the aromatic polyisocyanates, incorporated into the reaction mixture, more preferably for preparing PU rigid foams, are polyurethane catalysts in amounts from 0.1 to 10 weight percent, preferably about 1.5 weight percent based on the weight of the higher molecular polyol (b). Examples of typical polyurethane catalysts are: tertiary amines, such as dimethylbenzylamine, N,N,N',N'-tetramethyl-diaminoethylether, bis-(dimethylaminopropyl) urea, N-methyl- and/or N-ethylmorpholine, dimethylpiperazine, 1,2-dimethylimidazole, 1-aza-bicyclo-(3,3,0)-octane, and preferably triethylenediamine, metal salts such as tin dioctoate, lead octoate, tin diethylhexoate and more preferably tin-(II)-salts and tin dibutyltindilaurate as well as mixtures of tertiary amines and organic tin salts. The additional co-use of polyurethane catalysts along with polyisocyanurate catalysts is preferred in the preparation of PU-PIR-rigid foams for controlling or for normalizing of the polyaddition reaction and trimerization reaction.

(d) Low boiling point liquids are examples of organic, physically effective blowing agents, which evaporate under the influence of the exothermic addition polymerization reaction or polyaddition reaction and polymerization reaction. Suitable liquids which are inert to the organic polyisocyanate are those having boiling points below 50° C. Examples of these liquids are halogenated hydrocarbons, such as methylenechloride, trichlorfluoromethane, dichlordifluoromethane, dichloromonofluoromethane, dichlorotetrafluoroethane and 1,1,2-trichloro-1,2,2-trifluoroethane. Mixtures of these low boiling point liquids can be used with one another and/or with other subsitiued or unsubstitued hydrocarbons. The blowing agent is preferably used in quantities from 5 to 60 weight percent, more preferably from 20 to 50 weight percent based on the weight of the higher molecular weight polyol(b).

The PU- or PU-PIR rigid foams are prepared without the additional use of ordinary chain extending agents and/or crosslinkers (e). Yet, in many cases, because of industrial processing reasons, it chain extending agents and/or crosslinkers are preferably used. Suitable chain extending agents or crosslinkers have molecular weights from 60 to 400, preferably from 60 to 300 and preferably have from 2 to 4 reactive hydrogen atoms. Examples are aliphatic and/or aromatic diols having from 2 to 14, preferably from 2 to 6 carbon atoms, such as propanediol, pentanediol, 1,6-hexanediol and preferably ethanediol, 1,4-butanediol and bis-(2-hydroxyethyl)-hydroquinone; diamines for example ethylenediamine and optionally 3,3'-di- 3,3',5,5'-tetraalkylsubstituted 4,4'-diamino-diphenylmethanes; alkanolamines such as triethanolamine; multivalent alcohols, such as glycerin, trimethylolpropane; and lower molecular weight hydroxyl group containing polyalkylene oxides based on ethylene oxide and/or 1,2-propylene oxide and the previously stated compounds as initiatior molecules. If chain extending agents and/or crosslinkers are used then they are used in quantities from 0 to 30 weight percent, preferably from 5 to 25 weight percent based on the weight of the higher molecular weight polyol (b).

(f) Auxiliares and/or additives can also be optionally incorporated into the reaction mixture. Typical examples are surfactants, internal mold release agents, foam stablizers, cell regulators, fillers, colorants, pigments, flame retardants anti-hydrolysis agents and both fungi static and bacteristatic substances.

Surfactants which may be used are those which assist in the homogenation of the starting components and which optionally also regulate the cell structure. Typical examples are emulfiers like the sodium salts of caster oil, sulfates, or fatty acids as well as salts of fatty acids, with amines, such as oleic diethylamine or stearic acid diethanolamine; salts of sulfonic acid, such as alkali salts or ammonium salts of dodecylbenzolic acid, dinaphthylmethane disulfonic acids and ricinoleic acids; foam stablizers like siloxane-oxyalkylene-mixed polymers and other polysiloxanes, oxyethylated alkylphenols, oxyethylated fatty alcohols, parafin oils, caster oil and/or caster oil ester and Turkey red oil and cell regulators, like paraffin, fatty alcohols and dimethylpolysiloxanes. The surfactants are commonly employed in quantities from 0.01 to 5 parts by weight based on 100 parts by weight of the (b) component.

Carboxylic acid esters and/or carboxylic amides are suitable as internal molds released agents, which are prepared by the esterification or amination of a mixture comprising montanic acid and at least one aliphatic carboxylic acid having at least 10 carbon atoms with at least difunctional alkanolamines, polyols and/or polyamines having molecular weights from 60 to 400. The internal mold release agents are used in quantities from 0.1 to 10 parts by weight based on 100 parts by weight of the higher molecular weight polyol (b).

Fillers, in particular reinforcing fillers, are understood to be the essentially known organic and inorganic fillers, reinforcing substances, weight-increasing substances, substances for improving the wear resistance in paints coating, etc. Typical examples of inorganic fillers are: silicate minerals, for example laminar silicates such as antigorite, serpentine, horn blends, amphibole, chrisotile, talcum; metal oxides such as kaolin, aluminum oxides, titanium oxides and iron oxides; metal salts such as chalk, heavy spar; and inorganic pigments, such as cadium sulfide, zinc sulfide; as well as glass, powdered asbestos and others. Preferably used are: kaolin (China clay), aluminum silicate, and coprecipitates of barium sulfate and aluminum silicate, as well as natural and synthetic fibrous minerals, such as asbestos and Wollastonite, and preferably glass fibers of different lengths which optionally can be sized. Typical organic fillers are coal, melamine, pine resin, cyclopentadiene resins and graft polymers based on styrene-acrylonitrile, which are prepared through in-situ polymerization of acrylonitrilestyrene-mixtures in polyetherols substantially as described in the disclosures of German Pat. Nos. 11 11 394, 12 22 669 (U.S. Pat. Nos. 3,304,273; 3,383,351; 3,523,093; 1,152,536 (GB No. 1 040 452) and 1,152,537 (GB No. 987 618), as well as filler-polyoxyalkylene polyols, in which aqueous polymer dispersions are converted to polyoxyalkylene-polyol dispersions.

The inorganic and organic fillers are incorporated into the reaction mixture preferably in amounts of from 0.5 to 50 weight percent, preferably 1 to 40 weight percent, based on the weight of the components (a) through (c).

Suitable flame retardants are for example tricresylphosphate, tris-2-chloroethyl phosphate, tris-chloropropyl phosphate, and tris-2, 3-dibromopropyl phosphate.

In addition to the already mentioned halogen-substituted phosphates, inorganic flame retardants can also be used for flameproofing the rigid foams like aluminum hydroxide, antimony trioxide, ammonium polyphosphate, and calcium sulfate. Generally from 5 to 50 parts by weight, preferably from 5 to 25 parts by weight, of the said flame retardant is used for each 100 parts by weight of the (b) component.

Further information concerning the above mentioned other common auxiliary agents and additives can be obtained from the technical literature; for example, from the monograph of J. H. Saunders and K. C. Frisch, *High Polymers,* Vol. XVI, *Polyurethanes,* Parts 1 and 2, Interscience Publishers 1962 or 1964.

In preparing the PU-rigid foams, the organic polyisocyanate (a) and higher molecular weight polyol (b) as well as the optional chain extending agents and/or crosslinkers are reacted in such quantities so that the ratio of reactive hydrogen atoms to NCO-groups is from 1:0.8 to 2, preferably 1:0.9 to 1.5 and more preferably 1:1 to 1.2.

In preparing rigid foams containing urethane and isocyanurates groups, the quantitiy ratios of NCO groups from the polyisocyanates to the reactive hydrogen atoms from components (b) and optionally (e) are from 2 to 60:1, preferably from 2 to 6:1 and more preferably from 2 to 4.5:1.

The rigid foams containing urethane groups or urethane and isocyantates groups are prepared using the one shot process by means of either high pressure or low pressure technology. When using a mixing unit having several feed nozzles, the optionally heated starting components (a–d), as well as optionally (c and f) are individually fed in and mixed intensively in the mixing unit at temperatures from 10° to 80° C., preferably from 15° to 50° C. It has found to be particularly desirable to use a two-component process and to dissolve the higher moleuclar polyol (b) catalysts (c) blowing agents (d) as well as optionally chain extending agents and/or crosslinkers (e) and auxilliaries and/or additives (f) into the so-called A-side component and to use organic polyisocyanate (a) as the so-called B-side component. An advantage here is that the A and B components are stored for a limited time period and are able to be transported in a space saving manner and, in addition, they only need to be mixed together in the required quantities before processing.

The reaction mixture obtained is placed in open or closed, preferably heated molds made from plastics or preferably metal, optionally while compressing using a degree of compression from 1.1 to 8, preferably from 1.5 to 8 or more preferably from 2 to 6 and then allowed to cure.

The primarily open celled rigid foams containing urethane groups or urethane and/or isocyanurate groups have a density from to 25 to 800 g/l, preferably from 25 to 100 g/l, wherein rigid foams having lower densities, such as from 25 to 40 g/l, can be prepared according to the present process. The products are charterized by excellent hydrolysis stability and good mechanical properties, particularly by high flame resistence and an excellent heat insulation ability.

The rigid foams containing urethane groups or urethane and/or isocyanurate groups prepared according to the process of this invention are particularyly used for strengthening mechanical construction parts or as insulation material.

EXAMPLE 1

Preparation of a Polyester Polyol According to the Process of This Invention 85 parts by weight of 2-methyglutaric acid dimethylester, 15 parts by weight of 2-ethylsuccinic acid dimethylester, 42 parts by weight of triisopropanolamine, and 42 parts by weight of ethanediol were intensively mixed together while stirring at room temperature; the mixture was heated to 220° C. and then it was esterified at this temperature in a nitrogen atmosphere under normal pressure while distilling off the methanol. The polycondensation was carried out to its completion under a pressure reduction of about 50 mbar.

The resulting polyester polyol had a hydroxyl number of 302 mg KOH/g, an acid number of 0.8 mg KOH/g, a viscosity at 25° C. of 2600 mPas and had a trichlorofluoromethane compatibility of 80 g of trichlorofluoromethane per 100 g of polyester polyol.

COMPARATIVE EXAMPLE A

One hundred parts by weight of a mixture comprising adipic acid, glutaric acid and succinic acid, 48 parts by weight of triisopropanolamine and 50 parts by weight of ethanediol were intensiviely mixed together while stirring at room temperature; the mixture was heated to 220° C. and then esterified at this temperature in a nitrogen atmosphere under normal pressure and while distilling off the water of condensation until an acid number of about 20 was achieved. Subsequently, the polycondensation was carried out to its completion under a pressure reduction of about 50 mbar in ten hours time.

The resulting polyester polyol had a hydroxyl number of 300 mg KOH/g, an acid number of 1.0 mg KOH/g, a viscosity at 25° C. of 4000 mPas and had a trichlorofluoromethane compatibility of 36 g of trichlorofluoromethane per 100 g of polyester polyol.

EXAMPLES 2 AND 3 AND COMPARATIVE EXAMPLES B AND C

The Preparation of Rigid Foams Containing Both Urethane and Isocyanurate Groups

General Preparation Protocol

A-Side Component: a mixture containing a polyester polyol, a polyether polyol, flame retardant, foam stablizer, catalyst and blowing agent.

B-Component: a mixture containing a diphenylmethane diisocyanates and polyphenyl polymethylene polyisocyanates having a NCO content of 31 weight percent, referred to hereafter as polymeric MDI.

The A and B components were intensively mixed at 23° C. and then allowed to foam up in a carton having the dimensions 35×35×30 cm.

The type and quantity of starting materials used, the foam times reported and the mechanical properties measured on the rigid foams obtained are all summarized in the following Table I.

For the starting materials listed in Table I the following abbreviations were choosen:

| | |
|---|---|
| PES 1: | A polyester polyol prepared according to Example 1 |
| PES A: | A polyester polyol prepared according to Comparative Example A |
| PE: | A polyether polyol having a average functionality of 4.3 and hydroxyl number of 400, prepared by the addition polymerization of 1,2-propyleneoxide on a sucrose-glycerin mixture as a inititiar molecule. |
| Fyrol: | A mixture of Fyrol ® DMMP, a flame retardent from the Stauffer Chemical Corp., and PHT-4-diol, a flame retardent from the Great Lakes Company. |
| Silicone Oil | A surfactant, Tegostab ® B 8408 from Gold Schmidt AG |
| PIR-kat | Potassium acetate, a 20 weight percent solution in ethylene glycol |
| DMCH | dimethylcyclohexlyamine |
| CCl$_3$F | Trichlorofluoromethane |
| B2-Test | Flame test according to DIN 4102 |
| M 1 | Flame test according to the Epiradiateur Class [French Fire Class] |
| Compatibility: | Compatibility of grams of trichlorofluoromethane with 100 g of the A component. |

TABLE

| Example | | 2 | | 3 | |
|---|---|---|---|---|---|
| Comparative Example | | | B | | C |
| Starting Material | | | | | |
| Polymeric-MDI | parts by weight | 223 | 223 | 200 | 200 |
| PES 1 | parts by weight | 50 | — | 62 | — |
| PES A | parts by weight | — | 50 | — | 62 |
| PE | parts by weight | 40 | 40 | 15 | 15 |
| Fyrol | parts by weight | 10 | 10 | 16 | 16 |
| Silcone Oil | parts by weight | 1.5 | 1.5 | 2 | 2 |
| PIR-Kat | parts by weight | 1.2 | 1.2 | 1.5 | 1.5 |
| DMCH | parts by weight | 0.2 | 0.2 | 0.2 | 0.2 |
| CCl$_3$F | parts by weight | 47 | 47 | 35 | 35 |
| Foam Times | | | | | |
| Cream Time | sec | 57 | 57 | 16 | 17 |
| Gel Time | sec | 140 | 120 | 35 | 35 |
| Rise Time | sec | 180 | 175 | 70 | 71 |
| Mechanical Properties | | | | | |
| Density | g/l | 35.4 | 36.9 | 37 | 36 |
| B2-Test: | | | | | |
| edge | cm | 10 | 14 | 6 | 7 |
| area | cm | 10 | 13 | 7 | 7 |
| M 1 | sec | 5 | 5 | 1 | 1 |
| Compatibility | g/100 g | 97 | 50 | 95 | 45 |

The embodiments of the invention in which an exclusive privilege or property is claimed are defined as follows:

1. A process for preparing primarily closed cell rigid foams containing urethane groups, or urethane and isocyanurate groups through the reaction of
   (a) an organic polyisocyanate with
   (b) a higher molecular weight polyol in the presence of
   (c) a catalyst and
   (d) a blowing agent and optionally further including at least one of
   (e) chain extending agents and crosslinkers and
   (f) auxiliaries and additives.

wherein said polyol (b) consists of at least 30 weight percent based on the weight of polyol (b), of a polyester polyol containing in bonded form at least 20 weight percent, based on the entire polyester polyol weight, of units having one or more of the structures selected from:

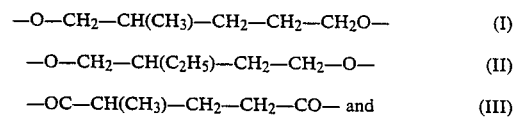

—O—CH$_2$—CH(CH$_3$)—CH$_2$—CH$_2$—CH$_2$O—   (I)

—O—CH$_2$—CH(C$_2$H$_5$)—CH$_2$—CH$_2$—O—   (II)

—OC—CH(CH$_3$)—CH$_2$—CH$_2$—CO— and   (III)

—OC—CH(C₂H₅)—CH₂—CO—.    (IV)

2. The process according to claim 1 wherein the polyester polyol used as polyol (b) contains in bonded form units having the structure

—O—CH₂—CH(CH₃)—CH₂—CH₂—O—    (I)

or

—O—CH₂—CH(C₂H₅)—CH₂—CH₂—O—    (II)

or both.

3. The process according to claim 1 wherein the polyester polyol used as polyol (b) contains in bonded form units having the structure

—OC—CH(CH₃)—CH₂—CH₂—CO—    (III)

or

—OC—CH(C₂H₅)—CH₂—CO—    (IV)

or both.

4. The process according to claim 1, wherein the polyester polyol used as polyol (b) has an average functionality of from 2 to 3, a hydroxyl number of from 100 to 400, an acid number of smaller than 10, and a viscosity at 25° C. of from 200 to 10,000 mPas.

5. The process according to claim 1 wherein mixtures of polyester polyols are used as polyol (b) and said mixtures are comprised of (i) from 50 to approximately 100 weight percent of at least one polyester polyol, which contains in bonded form units having one or more of the structures (I), (II), (III) and (IV), and (ii) from 50 to approximately 0 weight percent of ordinary polyester polyols and/or polyether polyols, wherein the weight percents are based on the entire weight of the polyol mixture.

6. The process according to claim 1 wherein the polyester polyols used as polyols (b) are prepared through the polycondensation of at least one of 2-methylglutaric acid, 2-ethylsuccinic acid, and organic dicarboxylic acids with 2-methyl-1,5-pentanediol, 2-ethyl-1,4-butanediol or aliphatic di- through tetravalent alcohols, provided that the starting materials used contain at least one compound selected from the group: 2-methylglutaric acid, 2-ethylsuccinic acid, 2-methyl-5-pentane diol and 2-ethyl-1,4-butanediol.

7. The process according to claim 1 wherein the primarily closed cell rigid foams containing urethane groups or urethane and isocyanurate groups have a density of from 25-100 g/l.

8. The process according to claim 1 wherein a mixture comprised of diphenylmethane diisocyanates and polyphenyl polymethylene-polyisocyanates having a diphenylmethane diisocyanate-isomeric content of from 20 to 65 weight percent, is used as the organic polyisocyanate (a).

9. Insulation material or strengthened mechanical construction parts prepared with a primarily closed cell rigid foam containing urethane groups or urethane and isocyanurate groups according to claim 1.

* * * * *